Sheet 1 - 2 Sheets
T. S. Steadman.
Mower.
№ 987
Reissued. Jun. 19, 1860.
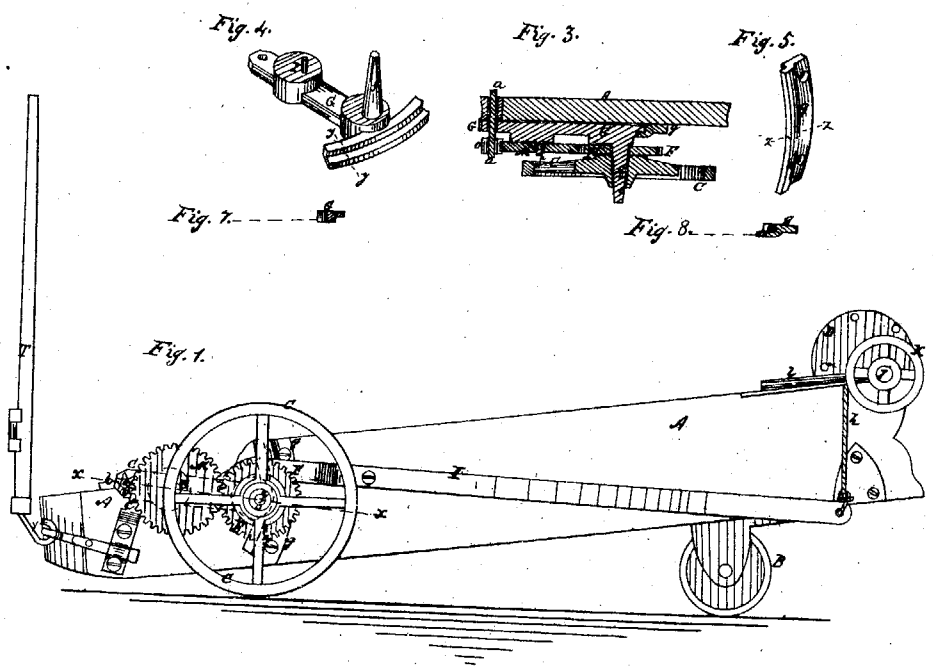
Witnesses
Abl. J. Hauck
Emanuel Rigel
Inventor
W. N. Whitely Sheet 2 of 2 Sheets.

T. S. Steadman.

Mower

No. 987

Reissued Jun. 19, 1860.

Witnesses
Chas. J. Shack,
Emanuel Rupp

Inventor
W. W. Whitely Jr.

UNITED STATES PATENT OFFICE.

W. N. WHITELEY, JR., OF SPRINGFIELD, OHIO, ASSIGNEE OF T. S. STEADMAN.

IMPROVEMENT IN CLOVER AND GRASS SEED HARVESTERS.

Specification forming part of Letters Patent No. 10,967, dated May 23, 1854; Reissue No. 987, dated June 19, 1860.

DIVISION C.

*To all whom it may concern:*

Be it known that THOMAS S. STEADMAN, of Murray, in the county of Orleans and State of New York, invented certain new and useful Improvements in Clover and Grass Seed Harvesters, of which the following is a full, clear, and exact description, reference being had to the annexed drawings, which make part of this specification.

This invention consists in the peculiar construction of the machine, whereby the attendant can, while riding on the machine, raise and lower the cutting apparatus and box, and raise or lower either side of the box, and either end of the cutting apparatus which is connected to it, while the other remains on or near the ground, and is enabled to hold the machine in either of said positions, substantially as is hereinafter more fully described.

I will describe the mode in which I have constructed and used the invention, referring by letters to the accompanying drawings, forming part of this specification, and in which—

Figure 10:
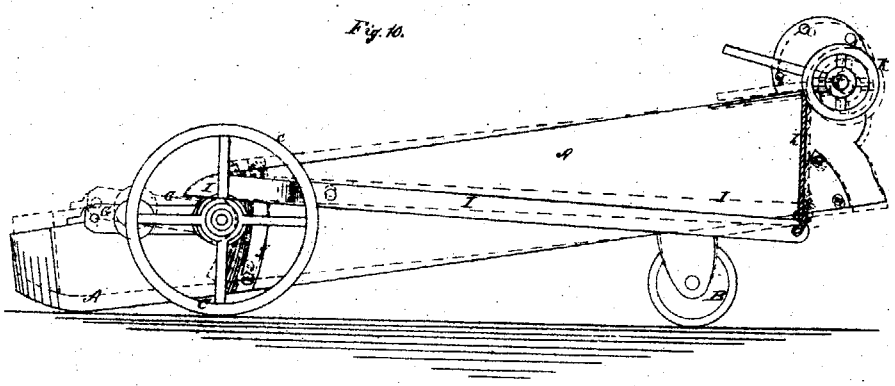
Figure 9:
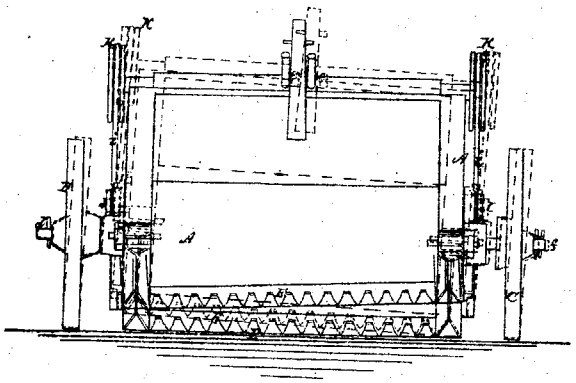

Figure 1 represents a side elevation of the machine. Fig. 2 represents a front elevation. Fig. 3 represents a cross-section at the line *x x* of Fig. 1. Fig. 4 represents a perspective view of the arm or supplementary frame. Fig. 5 represents a perspective view of the guide-plate of the supplementary frame. Fig. 6 represents in detail view the supplementary frame and gears. Fig. 7 shows a cross-section at *y y* of Fig. 4. Fig. 8 is a cross-section at the line *z z*, Fig. 5; and Figs. 9 and 10 are skeleton illustrative views, which will be explained hereinafter.

Similar letters represent the same parts in the different views.

A represents the main frame or box of the machine, and is five feet wide, ten feet long, and one and a half foot high, (may be more or less;) and B is a caster-wheel of one and a half foot diameter near its center and rear end, on which the rear end rests for permitting the machine to turn freely.

C and D are two wheels of three feet diameter, which serve to support the front end of the main frame or box A when the tooth or guard-finger bar E, permanently attached to the box, is not resting on the ground, and one of which, C, is the master-wheel, which has a cog-wheel, F, attached to it, which becomes part of it for driving the cutters. *f* is its axle, formed on or secured to and near the rear end of the arm or supplementary frame G, whose forward and vibrating end is hung on the projecting end of the pinion-shaft *a*, (which is confined to the upper edges of the frame or box A by its boxes *b* and $b^2$,) and there held by a flange-plate, *c*, which permits it to be slipped on and off of its shaft when turned on it.

The wheel D is hung on an axle, *d*, formed on or secured to an arm or supplementary frame, H, similarly constructed, hung, and retained as that of G. These arms, the pinion-shaft, and main frame vibrate from the master and grain wheel axles, or either of them, as fixed centers of motion, while they and the main frame vibrate from and around the pinion-shaft as their center. While the main frame rises or lowers the arms G and H are held parallel with the main frame or box, and both are guided by means of guide-plates *g* and $g^2$, fastened to the box, as shown at Figs. 1, 2 of the drawings, with that portion of them which surrounds the ends of the arms or supplementary frame.

I and J are the levers by which the attendant, while riding on the machine, gives the cutting apparatus and main frame or box the hereinafter-described movements.

*h* and *i* are the cords by which the levers I and J are operated, which pass over pulleys K and on the outer ends of the windlass-shafts *j* and *k*, which shafts are furnished with hand-levers *l* and *m*, which are checked or chocked by pins *u* and *o*, placed in such of the holes in the plate or disk L as will give the desired position for the main frame or box and cutting apparatus.

M is the intermediate wheel, and *p* is its axle, (formed on or connected to the arm or supplementary frame, which has on it the master-wheel axle, as shown at Figs. 1, 3, and 4,) and is made the proper size to gear properly with the master-wheel gear and pinion O. On its shaft, for driving the cutters and giving them the right motion gear M is placed, and there held by a pin, *r*, which permits it to be readily removed when not desired for driving the cutters, as is the case when driving the machine to and from the barn to unload it.

E is the bar forming the front of the frame A, to which the teeth or guard-fingers are secured, twenty in number, (more or less, according to the width of the machine.) These teeth are sixteen inches long and one and a half inch broad, and made of common spring-steel three-sixteenths of an inch thick, and are curved downward at their beds to suit the circle described by the cutters or knife, and their points are bent downward for taking up grass or clover that is "laid."

$s$ and $s^2$ are the cranks on the pinion-shaft, which are made six or eight inches long, and attached by boxes $t$ and $t^2$ to the upper edges and near the front side of wooden bars P and Q, which are four or five feet in length, the rear ends of which are connected with the lower ends of swinging arms $u$ and $v$, whose upper ends are pivoted to the upper edges of the frame or box at $x^2$ and $x^3$. A bar of wood or iron is attached to the under edges and near the front ends of the wooden bars P and Q, to which the cutters (ten in number) are attached. These cutters are angled on both sides, and are two inches wide at the heels, or where they are attached to the cutter-bar, and one-fourth of an inch at the points, and are six or seven inches long. These cutters are arranged with the center of each cutter over the center of each alternate tooth or finger. Thus it will be seen that there is an open space between the cutters, left for preventing them from clogging, and it will also be seen that by the center of each cutter being over the center of a tooth or finger the cutter is made to cut across the space at each of its edges and have its point guided for preventing its becoming bent or broken.

R is the rake-head, which is sixteen or eighteen inches in rear of the cutters, and forms a connecting-beam between the wooden bars P and Q, with teeth in its under side for removing that cut by the cutters in their succeeding vibration, which will readily be understood when it is seen that both the cutters and rake vibrate in an elongated or bell-shaped circle, the cutters describing nearly a circle in the larger part of the circle and the rake the same, but a smaller and more elongated circle. As many rakes may be used as desired. The cutters and rake or rakes have about six motions or vibrations to one revolution of the master-wheel, thus having a rapid motion cutting what comes between the teeth or guard-fingers.

T are the thills between which the animal is hitched which draws the machine, and by which it is guided, and these thills or shafts are hinged to the main frame at $Y^2$ and $Y^3$, for getting a hinge-joint between the cutting apparatus and team, which will permit the front of the frame or box to which the cutting apparatus is attached to be raised toward and lowered from the master-wheel axle, and its horizontal position varied without changing the position of the front ends of the thills, pole, or tongue, if used in their stead, and that they may be removed from the machine without the unloosing of bolts or screws.

It will readily be understood that the attendant can, while riding on the machine, raise that end of the cutting apparatus farthest from the master-wheel, which I shall call the "inner" end, while the outer end rests on the ground by bringing down the front end of lever J into the position shown in red at Fig. 9; and it will be also understood that when lever I is brought into the same position as that of J both ends of the cutting apparatus will be the same height from the ground; and it will be seen that by now raising the rear end of lever I until its front end occupies the position shown in red both ends of the cutting apparatus will be raised, but the outer one most, as seen in blue at Fig. 9: and it will be understood that a vice versa movement to the one above described can be given to the cutting apparatus—that is to say, the outer end given the same movement as those of the inner end; and, further, it will be understood that the attendant can, while riding on the machine, raise toward and lower from the master-wheel axle the front end of the main frame or box A, while the rear end remains supported by the caster-wheel, and thereby keep the guard-fingers or teeth much nearer parallel with the ground while the front of the frame is raised and lowered than it would if the frame or box were oscillated or vibrated from the master-wheel axle.

Having described the construction and operation of the improvements, I do not wish to be understood as limiting my improvements to the details of construction or the precise modes shown of putting them into practice.

What is claimed as the invention of the said THOMAS S. STEADMAN, and is desired to be secured by Letters Patent, is—

Constructing the machine in such a manner that the attendant can, while riding on the machine, raise and lower in the arc of a circle and hold at different heights either end of the cutting apparatus, as hereinbefore described, for the purpose specified.

In testimony whereof I have hereunto set my hand and affixed my seal this 27th day of March, A. D. 1860.

W. N. WHITELEY, JR. [L. S.]

Witnesses:
SOL J. HOUCK,
EMANUEL RIEGEL.